(12) United States Patent
Janagani et al.

(10) Patent No.: US 10,289,599 B2
(45) Date of Patent: May 14, 2019

(54) SYSTEM AND METHOD EMPLOYED FOR SIGNAL RECEPTION BY PROVIDING PROGRAMMABLE AND SWITCHABLE LINE TERMINATIONS

(71) Applicant: NXP USA, Inc., Austin, TX (US)

(72) Inventors: Krishna Murthy Janagani, Hyderabad (IN); Shivesh Kumar Dubey, Hyderabad (IN); Seshendra Muchukota, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 177 days.

(21) Appl. No.: 15/404,217

(22) Filed: Jan. 12, 2017

(65) Prior Publication Data
US 2018/0107624 A1   Apr. 19, 2018

(30) Foreign Application Priority Data
Oct. 15, 2016 (IN) ............................. 201641035315

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 6,813,320 B1* | 11/2004 | Claxton | H04B 1/28 341/77 |
| 2006/0291587 A1* | 12/2006 | Dally | H04L 25/03343 375/296 |
| 2007/0156932 A1* | 7/2007 | Kasahara | G06F 13/385 710/71 |
| 2009/0168848 A1* | 7/2009 | Constantinidis | H04B 1/707 375/140 |
| 2010/0091688 A1* | 4/2010 | Staszewski | H03D 7/1441 370/277 |
| 2014/0185715 A1* | 7/2014 | Wollesen | H04B 1/001 375/340 |
| 2016/0006584 A1* | 1/2016 | Agrawal | H04L 5/20 375/299 |
| 2016/0182096 A1* | 6/2016 | Panioukov | H04B 17/102 343/861 |
| 2016/0309274 A1* | 10/2016 | Ma | H03M 3/04 |
| 2018/0189224 A1* | 7/2018 | Vadivelu | G06F 13/4282 |

* cited by examiner

Primary Examiner — Michael Sun

(57) ABSTRACT

Exemplary embodiments of the present disclosure are directed towards a system and methods employed for signal reception by providing programmable and switchable line terminations a universal serial bus physical layer. The system comprising at least one switching unit comprising at least two receiver pad units configured to provide programmable and switchable line terminations for signal reception in the universal serial bus physical layer. The switching unit further comprises at least one current mode logic switching unit interfaced with the receiver pad units. The system further comprises two pairs of receiver pads connected to the receiver pad units configured to receive a plurality of speed signals from at least four transmission units. The receiver pad units are enabled to route the plurality of speed signals to at least one input of a receive amplifier through the current mode logic switching unit.

15 Claims, 4 Drawing Sheets

SYSTEM AND METHOD EMPLOYED FOR SIGNAL RECEPTION BY PROVIDING PROGRAMMABLE AND SWITCHABLE LINE TERMINATIONS

TECHNICAL FIELD

The present disclosure generally relates to the field of efficient signal reception systems and methods. More particularly, the present disclosure relates to a system and methods employed for signal reception by providing programmable and switchable line terminations in a universal serial bus (USB) physical layer.

BACKGROUND

Universal serial bus (USB) is the most popular and widely used protocol that has been adapted for communications between computers and peripheral devices. USB 3.0 has been developed for digital video delivery and display. Typically, the USB 3.0 protocols has data transfer rate of 5 GBPS, over 10 times faster than the typical USB 2.0. USB Type-C offers a number of features, including a high level of flexibility and convenience to the end users. This interface consolidates data, power and video into a single connector interface. The USB type-C supports USB 2.0 and USB 3.0 and provides options for alternate modes such as display port for video. The USB type-C plug enhances ease of use by being pluggable in either upside-up or upside-down directions and in either directions between host and devices.

Referring to FIG. 1 (Prior Art) is a diagram 100 depicting a USB type-C receptacle pin map interface system. The pin interface system includes high speed data transmission paths 102a-102d, high speed data reception paths 104a-104b, ground cable 106a-106d, cable bus power 108a-108d, USB 2.0 interface (D+ and D− signals) 110a-110d, sideband pins 112a-112b, and power delivery adapters 114a-114b. The pin interface system 100 is arranged in symmetrical fashion that facilitates flipping the cable. A typical system implementation shorts two D+ and two D− signals 110a-110d with stub connections to accommodate a flippable plug, such a stubbed connection for super speed 5G signals, this is not feasible due to signal integrity concerns at these speeds. If a display port alternate mode is used, this shorting with stubs is not possible because the display port mode requires the 4 ports to be configured as independent transmissions. One conventional approach to solve this is to use external data path switches. The usage of external data path switches causes loss in the switch, affects the channel loss budget from the USB port to the Type-C connector. For USB 3.0 implementations, the USB type-C can limit the length of the printed circuit board traces from the USB port to connector to around 15 cms, depending on the quality of the PCB. For USB 3.1 implementations, the USB type-C have a smaller channel loss budget, the use of an external switch can cut the PCB traces lengths to 5 cm or less.

Referring to FIG. 2 (Prior Art) is a diagram 200 depicting universal serial bus physical layer. The universal serial bus physical layer includes transmission units 202-208 and the receiver units 210-212. One of the receiver units 202-204 is active depending on the connector orientation. The other receiver unit 202-204 stays in a low power state. This approach doesn't use an external data path switches therefore not degrading signal quality, but the cost is the additional receiver area and corresponding clock distribution power due to the increased routing length.

In the light of aforementioned discussion there exists a need for certain systems with efficient methodologies for implementing a switching unit in the universal serial bus physical layer and also need arises for maintaining signal integrity, for example at 5G speeds that would overcome or ameliorate the above mentioned disadvantages.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards a system and method of signal reception by providing programmable and switchable line terminations in a universal serial bus physical layer.

According to an exemplary aspect, the system includes at least one switching unit comprises at least two receiver pad units configured to provide programmable and switchable line terminations for signal reception in a universal serial bus physical layer, wherein the switching unit comprises at least one current mode logic switching unit interfaced with the receiver pad units.

According to an exemplary aspect, the system includes at least two pairs of receiver pads connected to the receiver pad units configured to receive a plurality of speed signals from at least four transmission units, wherein the receiver pad units enabled to route the plurality of speed signals to at least one input of a receive amplifier through the current mode logic switching unit.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

Figure 1:
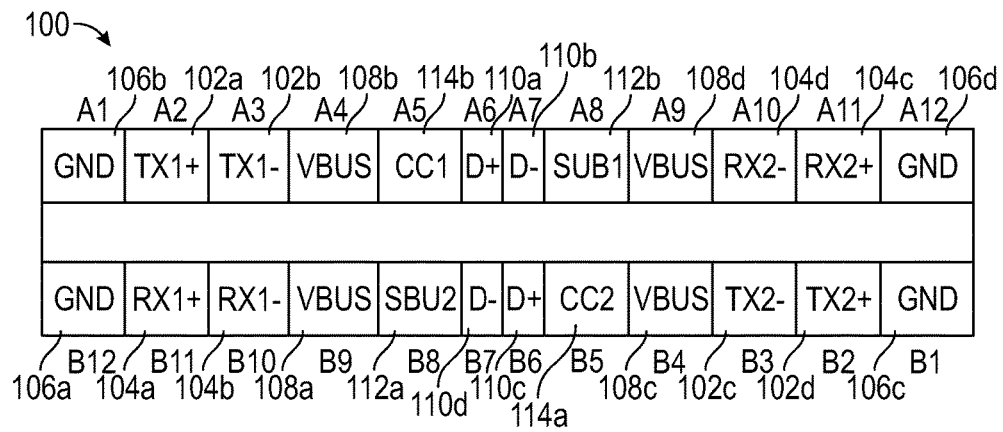
FIG. 1 (Prior Art) is a diagram depicting a USB type-C receptacle pin map interface system.
Figure 2:
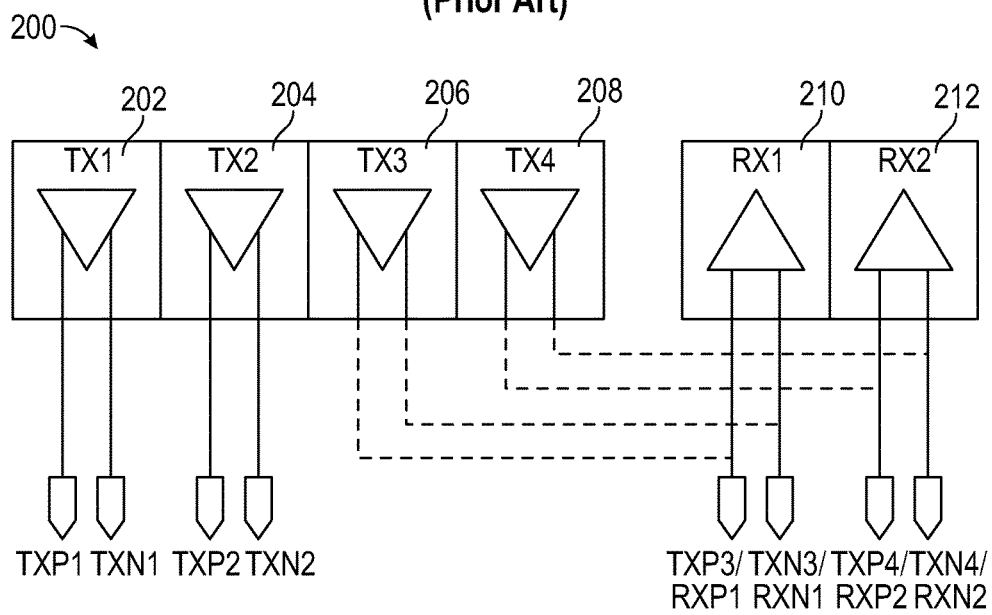
FIG. 2 (Prior Art) is a diagram depicting universal serial bus physical layer.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Figure 3:
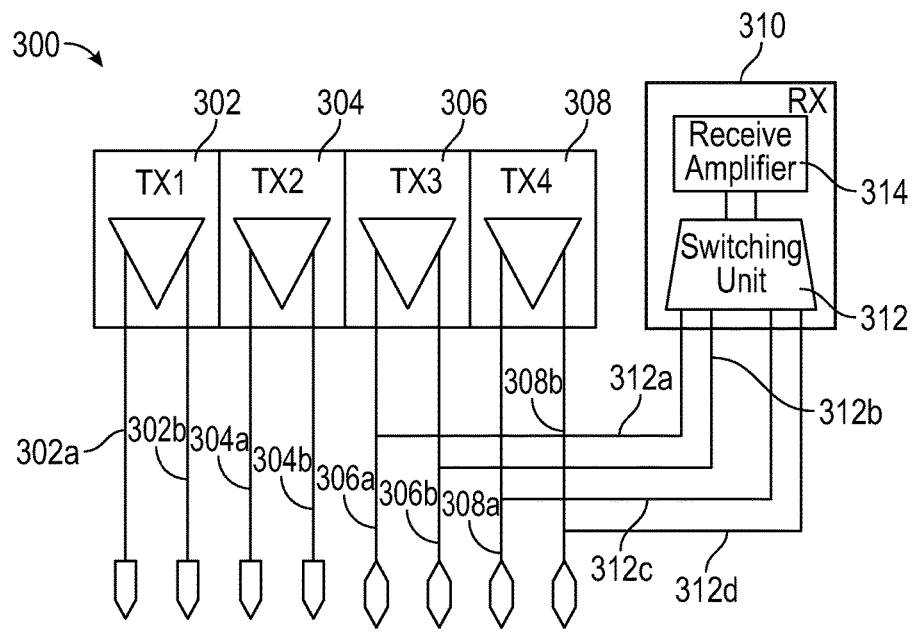
FIG. 3 is a diagram depicting a system of signal reception by providing programmable and switchable line terminations in a universal serial bus physical layer, according to an exemplary embodiment of the present disclosure.

Referring to FIG. 3 is a diagram 300 depicting a system of signal reception by providing programmable and switchable line terminations in a universal serial bus physical layer, according to an exemplary embodiment of the present disclosure. The system includes a universal serial bus physical layer. The universal serial bus physical layer includes transmission units 302-308 and a receiver unit 310. Each transmission unit 302-308 further includes two transmission (TX) pads (302a, 302b)-(308a, 308b). The receiver unit 310 includes a switching unit 312, and a receive amplifier 314. The universal serial bus physical layer may include, but not limited to, universal serial bus 3.0 display port Type-C physical layer.

According to non-limiting exemplary embodiments of the present disclosure, the transmission (TX) units 302-308 may be configured to take the low frequency parallel data streams and convert into high frequency serial data streams. The transmission pads 302a, 302b and 308a, 308b may be configured to operate the high frequency serial data streams by using current mode logic pre-drivers and drivers. The current mode logic drivers may drive a programmable current onto calibrated line termination impedances to produce a programmable output swing. The impedance matching may be obtained by the terminations for reliable data transmission at high frequencies.

According to non-limiting exemplary embodiments of the present disclosure, the receiver unit 310 may be configured for supporting flippable connection, followed by the receiver amplifier 314. The switching unit 312 further includes pairs of receiver pads 312a-312d. The switching unit 312 may include switching elements such as multiplexors and associated pairs receiver pads 312a-312d configured to route the signals at high speed.

Figure 4A:
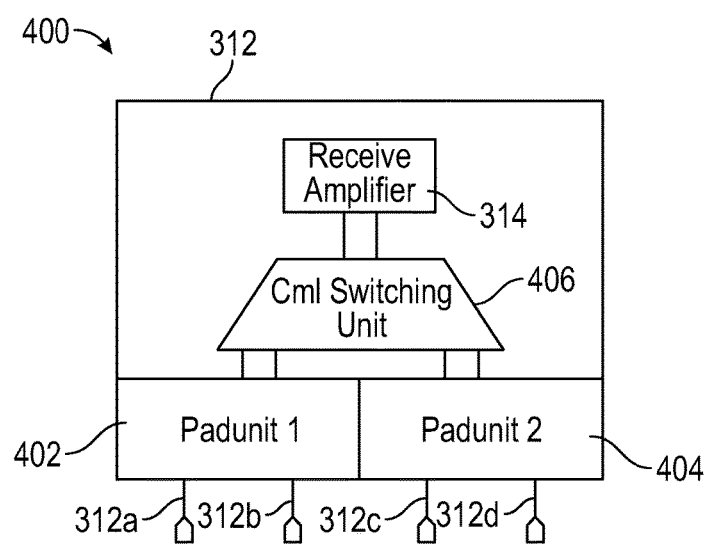
FIG. 4A is a diagram depicting a switching unit for signal reception by providing programmable and switchable line terminations in a universal serial bus physical layer, according to an exemplary embodiment of the present disclosure.

Referring to FIG. 4A is a diagram 400a depicting a switching unit for signal reception by providing programmable and switchable line terminations in a universal serial bus physical layer, according to an exemplary embodiment of the present disclosure. The switching unit 312 includes receiver pad units 402-404 and a current mode logic switching unit 406. The current mode logic switching unit 406 may include switching elements such as current mode multiplexors, and the like, without limiting the scope of the present disclosure.

According to non-limiting exemplary embodiments of the present disclosure, the switching unit may provide line terminations with the receiver pad units 402-404. The receiver pad units 402-404 may be interfaced with the pairs of receiver pads 312a-312d followed by the current mode logic switching unit 406. The switching unit 312 may select appropriate pad pair 312a-312d and properly route the speed signals without degrading the signal integrity to the input of the receiver amplifiers 314. The switching unit 312 may provide line terminations by the receiver pad units 402-404. The switching unit 312 may include circuitry for selecting proper common mode to the current mode logic switching unit 406. The current mode logic switching unit 406 may select one of the two inputs and direct it to the output. The current mode logic switching unit 406 may have adequate gain and bandwidth for properly routing the super speed signals to the receive amplifiers 314 without introducing the inter symbol interference.

Figure 4B:
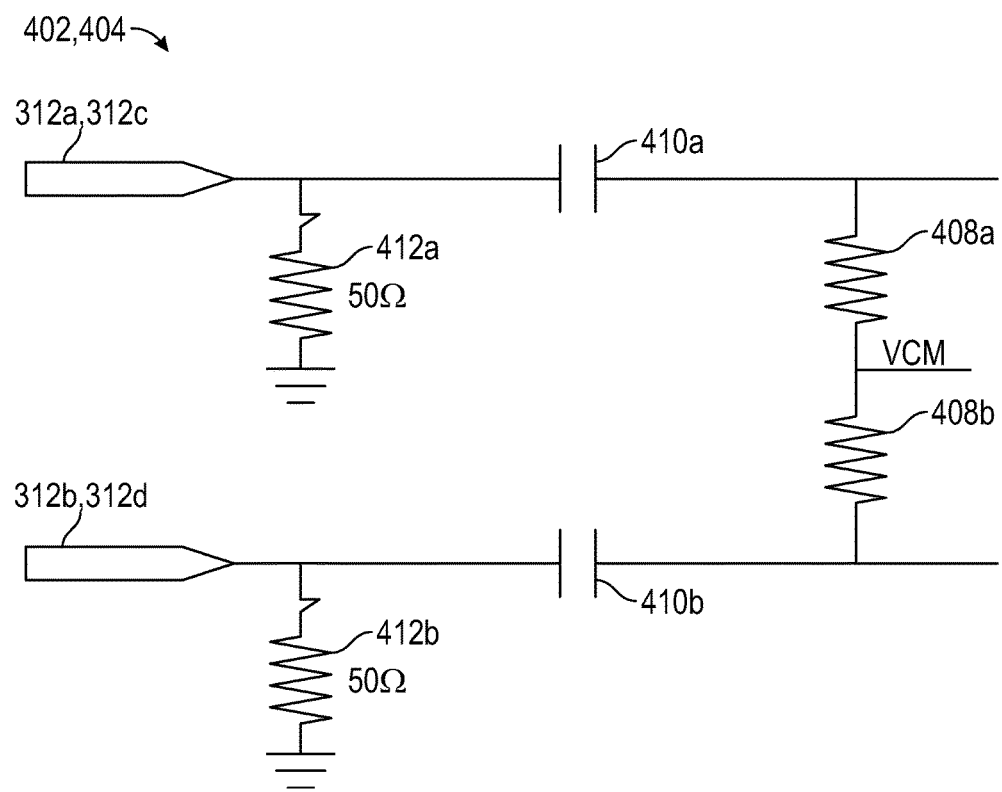
FIG. 4B is a diagram depicting a receiver pad unit of the switching unit for signal reception by providing programmable and switchable line terminations in a universal serial bus physical layer, according to an exemplary embodiment of the present disclosure.

Referring to FIG. 4B is a diagram depicting a receiver pad unit of the switching unit for signal reception by providing programmable and switchable line terminations in a universal serial bus physical layer, according to an exemplary embodiment of the present disclosure. The receiver pad unit 402-404 includes a common mode adjustment circuitry. The common mode adjustment circuitry may include, but not limited to, switchable and programmable line termination resistors 412a-412b, AC coupling capacitors 410a-410b, and common mode resistors 408a-408b. The switchable and programmable line termination resistors 412a-412b may include, but not limited to, 50 ohms.

According to non-limiting exemplary embodiments of the present disclosure, the receiver pad units 402-404 are configured to provide programmable and switchable line terminations using the switchable and programmable line termination resistors 412a-412b for signal reception. The switchable and programmable line termination resistors 412a-412b in the receiver pad units 402-404 may be calibrated with the external resistors to provide a constant resistance across process voltage temperature (PVT) variations. By turning on the matched terminations, the receiver pad units 402-404 may maintain adequate signal integrity for the super speed signals. The common mode adjustment circuitry may provide programmable common mode voltage to the current mode logic switching unit 406. This programmability in common mode may add degree of flexibility to the receiver unit 310.

According to non-limiting exemplary embodiments of the present disclosure, the receive amplifier 314 being operated to receive the speed signals from the transmission units 302-308 through the current mode logic switching unit 406, the receiver pad units 402-404, pairs of receiver pads 312a-312d and pairs of transmission pad (302a, 302b)-(308a, 308b). In the case of universal serial bus physical layer, two transmission units 302-308 may be enabled and the other two transmission units 302-308 may be disabled. One pair of receiver pads 312a-312d may receive the speed signals from the transmission units 302-308 depending on the connectivity with the switching unit 312.

Figure 5:
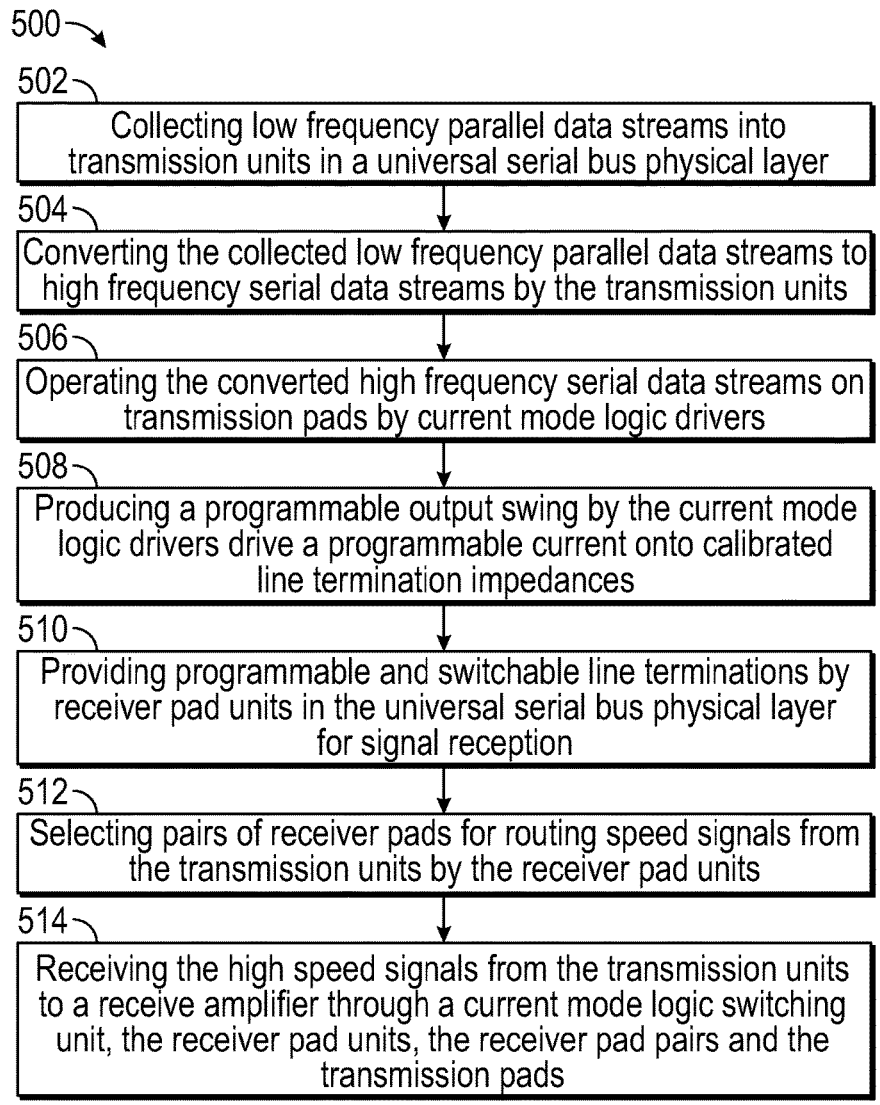
FIG. 5 is a flow diagram depicting a method of signal reception by providing programmable and switchable line terminations in a universal serial bus physical layer, according to an exemplary embodiment of the present disclosure.

Referring to FIG. 5 is a flow diagram 500, depicting a method for signal reception by providing programmable and switchable line terminations in a universal serial bus physical layer, according to an exemplary embodiment of the present disclosure. As an option, the method 500 may be carried out in the context of the details of FIG. 1, FIG. 2, FIG. 3, and FIG. 4. However, the method 500 may also be carried out in any desired environment. Further, the aforementioned definitions may equally apply to the description below.

The method starts at step 502, low frequency parallel data streams may be collected into transmission units in a universal serial bus physical layer. The collected low frequency parallel data streams may be converted to high frequency serial data streams by the transmission units, at step 504. The converted high frequency serial data streams may be operated on transmission pads by current mode logic drivers, at step 506. The current mode logic drivers may be enabled to produce a programmable output swing by driving programmable current onto calibrated line termination impedances, at step 508. Programmable and switchable line terminations may be provided by receiver pad units for signal reception, at step 510. The pad units are enabled to select pairs of receiver pads for routing speed signals from the transmission units, at step 512. The high speed signals may be received from the transmission units to a receiver amplifier through a current mode logic switching unit, the receiver pad units, the receiver pad pairs and the transmission pads, at step 514.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

What is claimed is:

1. A system of signal reception by providing programmable and switchable line terminations in a universal serial bus physical layer, comprising:
    transmission units configured to convert a plurality of low frequency parallel data streams into a plurality of high frequency serial data streams;
    at least one switching unit comprises at least two receiver pad units configured to provide programmable and switchable line terminations for signal reception, wherein the switching unit comprises at least one current mode logic switching unit interfaced with the receiver pad units; and
    at least two pairs of receiver pads connected to the receiver pad units configured to receive a plurality of speed signals from at least four of the transmission units, wherein the receiver pad units are enabled to route the plurality of speed signals to at least one input of a receive amplifier through the current mode logic switching unit.

2. The system of claim 1, wherein the receiver pad units comprises a plurality of switchable and programmable line termination resistors.

3. The system of claim 1, wherein the receiver pad units further comprises a plurality of coupling capacitors and a plurality of common mode resistors.

4. The system of claim 1, wherein the universal serial bus physical layer comprises the transmission units and at least one receiver unit.

5. The system of claim 1, wherein at least of the one transmission units comprises at least two transmission pads.

6. The system of claim 4, wherein the transmission units are configured to convert a plurality of low frequency parallel data streams into a plurality of high frequency serial data streams.

7. The system of claim 6, wherein the transmission pads are enabled to operate a plurality of high frequency serial data streams by a plurality of current mode logic drivers.

8. The system of claim 7, wherein the plurality of current mode logic drivers are enabled to produce a programmable output swing by drives programmable current onto calibrated line termination impedances.

9. The system of claim 1, wherein the current mode logic switching unit is configured to select the input receive amplifier and directs the input receive amplifier to the output receiver pad units.

10. The system of claim 1, wherein the switching unit is positioned in the receiver unit of the universal serial bus physical layer.

11. A method of signal reception by providing programmable and switchable line terminations in a universal serial bus physical layer, comprising:
    converting a plurality of low frequency parallel data streams into a plurality of high frequency serial data streams by at least four transmission units in a universal serial bus physical layer;
    operating the plurality of high frequency serial data streams on a plurality of transmission pads by a plurality of current mode logic drivers, wherein the plurality of current mode logic drivers are enabled to produce a programmable output swing by driving programmable current onto calibrated line termination impedances;
    providing programmable and switchable line terminations by a plurality of receiver pad units for signal reception in the universal serial bus physical layer, wherein the plurality of pad units are enabled to select a plurality of receiver pad pairs for routing a plurality of speed signals; and
    receiving the plurality of speed signals from the transmission units to at least one receive amplifier through a current mode logic switching unit, the plurality of receiver pad units, the plurality of receiver pad pairs and the plurality of transmission pads.

12. A method of signal reception by providing programmable and switchable line terminations in a universal serial bus physical layer, comprising:
    converting a plurality of low frequency parallel data streams into a plurality of high frequency serial data streams by a plurality of transmission units in a universal serial bus physical layer;
    operating the plurality of high frequency serial data streams on a plurality of transmission pads by a plurality of current mode logic drivers, wherein the plurality of current mode logic drivers are enabled to produce a programmable output swing by driving programmable current onto calibrated line termination impedances;
    providing programmable and switchable line terminations by a plurality of receiver pad units for signal reception in the universal serial bus physical layer, wherein the plurality of pad units are enabled to select a plurality of receiver pad pairs for routing a plurality of speed signals; and
    receiving the plurality of speed signals from the transmission units to a plurality of receive amplifiers through a current mode logic switching unit, the plurality of receiver pad units, the plurality of receiver pad pairs and the plurality of transmission pads.

13. A system of signal reception by providing programmable and switchable line terminations in a universal serial bus physical layer, comprising:
    at least four transmission units configured to convert a plurality of low frequency parallel data streams into a plurality of high frequency serial data streams in an universal serial bus physical layer, wherein the at least one transmission unit comprises at least two transmission pads enabled to operate the plurality of high frequency serial data streams;

at least one receiver unit configured to receive a plurality of speed signals from the transmission units in the universal serial bus physical layer through a plurality of receiver pad pairs, wherein the receiver unit comprises at least one switching unit configured to provide a programmable and switchable line terminations for signal reception; and at least one receive amplifier being operating to receive a plurality of speed signals from the transmission units, wherein the switching unit is enabled to route the plurality of speed signals from the transmission units to the receive amplifier.

14. The system of claim 13, wherein switching unit comprises at least two receiver pad units configured to provide programmable and switchable line terminations for signal reception.

15. The system of claim 13, wherein the switching unit comprises at least one current mode logic switching unit configured to select at least one of the input receive amplifiers and directs the input receive amplifier to the output receiver pad units.

* * * * *